(No Model.)

B. F. HAUGH.
CAR WHEEL.

No. 480,922. Patented Aug. 16, 1892.

Witnesses
Inventor
Benjamin F. Haugh
By his Attorney

UNITED STATES PATENT OFFICE.

BENJAMIN F. HAUGH, OF INDIANAPOLIS, INDIANA.

CAR-WHEEL.

SPECIFICATION forming part of Letters Patent No. 480,922, dated August 16, 1892.

Application filed March 10, 1892. Serial No. 424,417. (No model.)

*To all whom it may concern:*

Be it known that I, BENJAMIN F. HAUGH, a citizen of the United States, residing at Indianapolis, in the county of Marion and State of Indiana, have invented new and useful Improvements in Cushioned Car-Wheels, of which the following is a specification.

My invention relates to an improvement in cushioned car-wheels; and it has for its object to provide means whereby the elasticity or cushioning capacity of the wheel will be increased, and also to provide a suitable guard or shield for protecting the cushion from the superfluous oil or drippings that flow or are forced from the oil-box of the journal of the axle. I attain these objects by means of the arrangement of the wheel illustrated in the accompanying drawings, in which—

Figure 1:
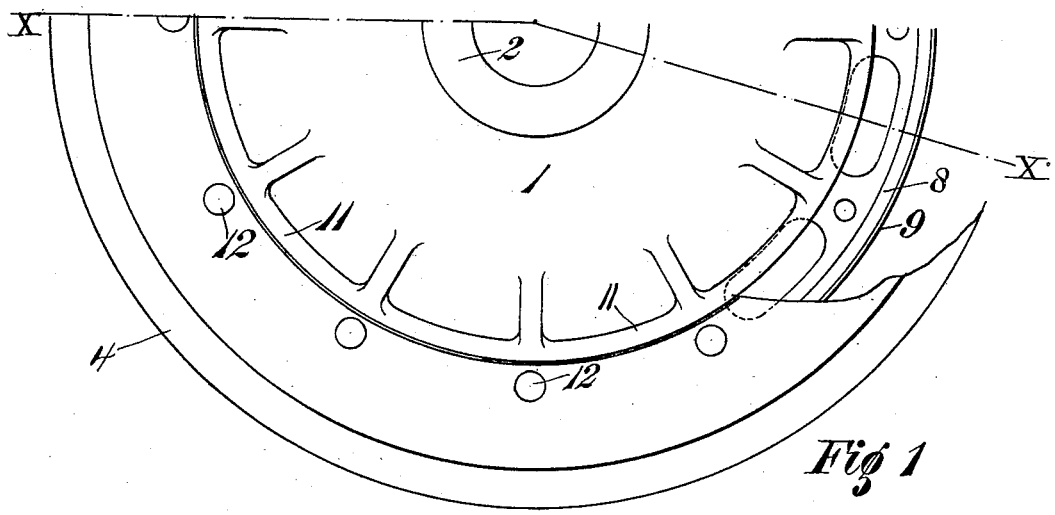
Figure 2:
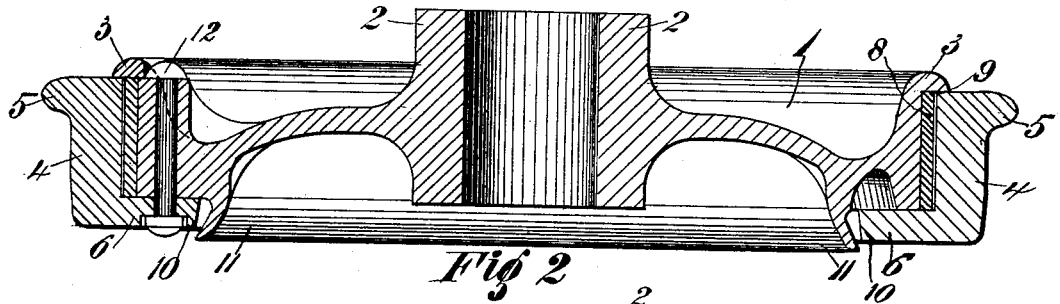
Figure 3:
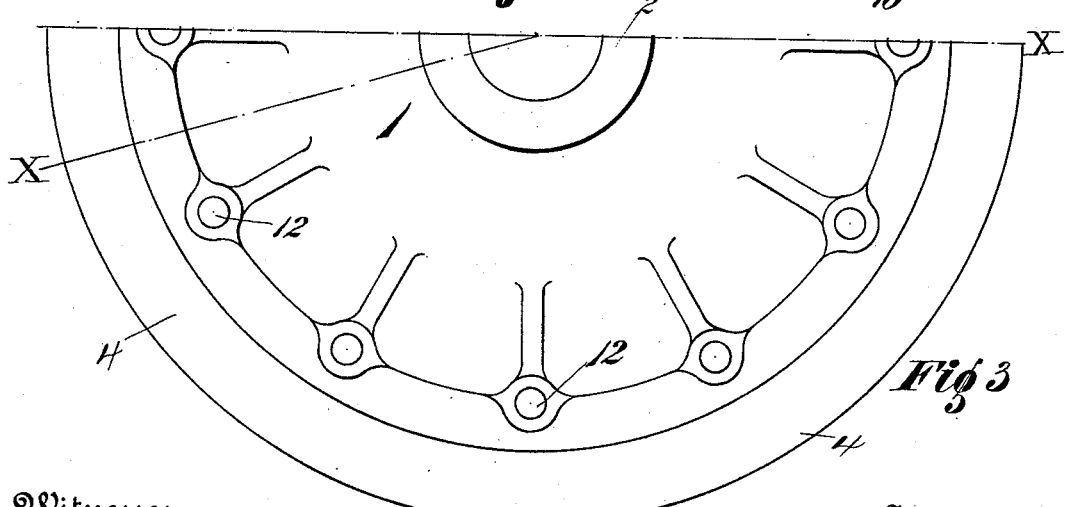

Figure 1 is a part elevation of the outer face of the wheel, or the face next the oil-box, showing the outwardly-flaring flange for deflecting the waste oil from the joint of the flange. Fig. 2 is a section of the same through the line X X, (see Figs. 1 and 3,) and Fig. 3 is a part elevation of the inner face of the wheel.

Similar numbers of reference designate like parts throughout the several views.

1 designates the center or main body of the wheel (preferably of steel) having the hub 2 and the peripheral flange 3, formed thereon and integral therewith and provided for the purpose of relieving the flange of the tire from any undue or excessive stress that may be brought to bear upon it, as by a longitudinal blow.

4 designates the tire of the wheel, having its tread of the usual or any suitable form and provided at or near its outer face and on the face opposite its flange 5 with the annular and inwardly-projecting flange 6, formed integral thereon, said flange having its inner edge tapered or flared outwardly, as shown particularly in Fig. 2, for the purpose hereinafter set forth.

Between the bearing-peripheries of the flange 3 and the tire 4 is interposed the cushion 8, (preferably of rubber or other resilient material,) which completely encircles said centers and extends entirely across the face thereof.

9 designates the shield encircling the outer periphery of the cushion for the purpose of protecting it from abrasion or wrinkling when forcing the tire on its center.

11 designates the oil shield or guard of the wheel center, which is formed integral on the outer face thereof and having its inner surface flared outwardly from the outer face of said center, which is provided for the purpose of deflecting the waste oil from the joint between the flange 5 of the tire and the center 1, thus effectually directing the flow of the waste oil outwardly and protecting the cushion from any oil that would gradually work through said joint.

It has been found in practice that in order to increase the elasticity of the wheel, and consequently its cushioning capacity, the elastic cushion 8 should extend entirely across the face of periphery of the center 1, thus bringing said cushion into close proximity to the joint between the flange 5 of the tire and the center 1. This construction, however, affords a ready means for waste oil to gain access to the cushion, which destroys its elastic qualities and soon renders it worthless by causing a decomposition of the rubber and reducing it to a plastic condition. For this reason I provide the annular outwardly flaring and deflecting flange 11 for the purpose of deflecting the waste oil from said joint 5, as hereinbefore set forth, and also slightly flare the edge 10 of the flange 6 for the same purpose. The tire is secured to the main center of the wheel by the peripheral securing bolts or rivets 12, passing through the flange 5 and the periphery of the said center in the usual way, and needs no special description, the holes in the flange of the tire being larger in diameter than the body of said bolts for the purpose of permitting the tire to play freely on its center.

Having thus fully described the nature and construction of my invention, what I claim as new and useful, and desire to cover by Letters Patent of the United States therefor, is—

1. In a cushioned car-wheel, the combination, with the center and the tire thereof having an interposing elastic cushion, of an inwardly-projecting flange formed on said tire and adapted to contact with the outer face of said center, an annular outwardly-flaring flange or shield projecting over the inner edge of said flange of tire, and suitable means for securing said tire to said center, substantially as set forth.

2. In a cushioned car-wheel, the combination, with the center and the tire thereof having an interposing elastic cushion, of an inwardly-projecting flange formed on said tire and adapted to contact with the outer face of said center, said flange having its inner edge flaring slightly outwardly, as described, an annular outwardly-flaring flange or shield projecting over and beyond the outer face of the flange of said tire, and suitable means for securing said tire and center, substantially as described.

3. In a cushioned car-wheel, the combination, with the tire and the center thereof having an inwardly-projecting peripheral thrust-flange formed on the inner face of said center and an inwardly-projecting flange formed on the outer face of said tire, of an interposing elastic cushion extending along the face of the bearing-periphery of said center and between said thrust-flange of center and flange of tire, an annular outwardly-flaring flange formed on the outer face of said center and projecting slightly over the outer face of the flange of said tire, and suitable securing-bolts passing through said flange and periphery of the wheel center, all substantially as and for the purpose described.

In testimony whereof I have hereunto set my hand in the presence of two subscribing witnesses.

BENJAMIN F. HAUGH.

Witnesses:
THOMPSON R. BELL,
JNO. GEO. THURTLE.